Oct. 7, 1930.  G. W. JEFFERY  1,777,695

FISHHOOK DISGORGER

Filed March 28, 1929

INVENTOR
G. W. JEFFERY
BY
ATTORNEY

Patented Oct. 7, 1930

1,777,695

UNITED STATES PATENT OFFICE

GEORGE WILLIAM JEFFERY, OF TWICKENHAM, ENGLAND

FISHHOOK DISGORGER

Application filed March 28, 1929, Serial No. 350,737, and in Great Britain September 13, 1928.

This invention relates to fish hook disgorgers, that is to say, devices for quickly and conveniently releasing a fish hook from the tissues of a fish's throat, gullet or stomach.

It is an object of the present invention to provide a disgorger which will quickly and effectively release the fish hook from the tissues in as speedy and direct a manner as possible.

It is a further object of the invention to provide a disgorger which is provided with a member for engaging with the tissues adjacent the hook and a second member movable relatively thereto which will release the hook from the engaged tissues without injuring or disturbing the remoter parts of the gullet or stomach of the fish.

It is a further object of the invention to provide a disgorger which includes a tissue-engaging member having a bifurcated end to straddle the fish hook, an extractor member having slidable engagement therewith, the extractor member being operable from a point externally of the fish's mouth.

It is a further object of the invention to provide a fish hook disgorger which is provided with a recess to house the point of the fish hook after extraction, so as to prevent its accidental or other re-engagement with the tissues during the withdrawal of the apparatus from the fish's mouth.

With these and other objects in view, the invention consists in the arrangement and combination of parts which will hereinafter be more fully described and set out in the appended claims.

In the preferred form the disgorger, which is made of strip brass, comprises a guide member having a bifurcated end, the arms of the bifurcation being separated by a slot and terminating in spikes to engage the tissue, and an extractor member having slidable engagement with the guide member, the end of the extractor member being notched to engage with the fish hook, which is extracted by causing relative movement between the extractor and the guide member. The notch also serves when the fish hook is out of sight, to guide the apparatus during insertion so that the arms of the bifurcation can be engaged with the tissue on each side of the fish hook, this being accomplished by running the notch of the extractor member lightly down the line and shank of the hook.

The invention is illustrated in the accompanying drawing in which—

Figure 1:
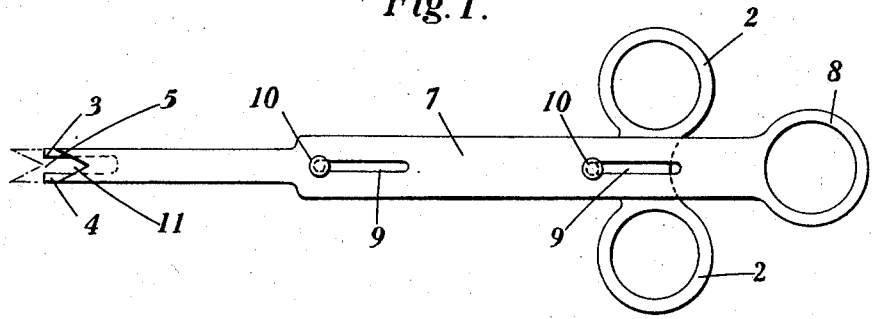
Figure 2:
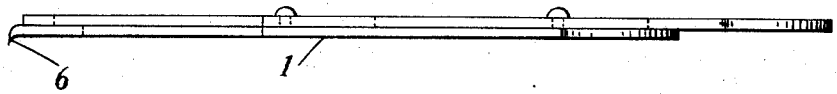
Figure 3:
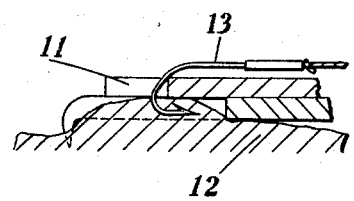
Figure 4:
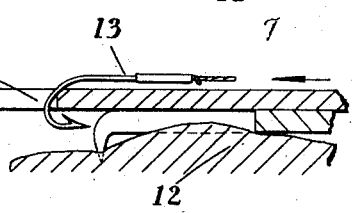
Figure 5:
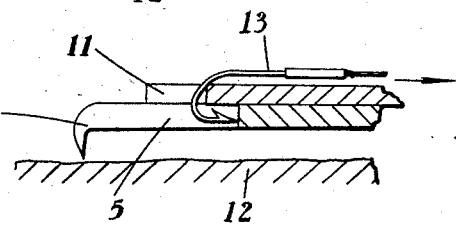

Figure 1 shows a plan and Figure 2 a side elevation of a preferred form of disgorger, Figures 3, 4 and 5 illustrating the relative movement of the parts in operation.

Turning now to the form illustrated, the guide member is formed of a flat brass strip 1, provided with a pair of finger rings 2, and terminating at its forward end in two prong-like members 3, 4 separated by a slot 5 and having their extreme ends pointed and bent down in the shape of spikes or hooks 6. The push rod is also formed of a brass strip 7 and terminates at one end in a thumb ring 8. It is provided with slots 9 whereby it is held in slidable relation with the guide member 1 by rivets 10. At its forward end the push rod is provided with a V-shaped notch 11.

In operation the guide member engages with the tissues 12, Fig. 3, of the fish adjacent to the fish hook 13, the arms of the bifurcation 3, 4 lying one on each side of the fish hook to straddle same. This position is easily reached even when the hook cannot be seen by lightly running the bottom of the slot 5 down the line and shank of the hook. The push rod 7 is then moved to the left in Fig. 1 so that the bottom of the notch 11 engages the fish hook 13 and extracts it as shown in Fig. 4.

It will be appreciated that in use the device is preferably pressed down so that the actual movement of the barb of the fish hook is required to take place between the downwardly directed prongs 3, 4 and that the tissues will first be gathered up into a slight pucker or swelling behind the prongs as shown in Figure 3, so that the fish hook then reaches its point of exit after a minimum travel not usually exceeding the linear distance between the barb and the rear faces of the prongs 3, 4, during which operation the guide member exerts a sufficient retaining force on the surrounding tissue to avoid injuring or disturbing the remoter parts of the gullet or stomach of the fish.

After the fish hook has been extracted as shown in Figure 4, the push rod is retracted, keeping the line tight, to the position shown in Figure 5 before withdrawal of the disgorger, in which position the hook and barb of the fish hook will lie snugly within the slot 5 as shown, and will not be liable again to catch in the tissues of the fish during the withdrawal of the device.

In the preferred form the parts are made of brass stampings or other sheet metal, but the invention is not confined to this form of construction but includes, for example, a disgorger in which the guide member is formed of a pair of wires and a push rod of a single wire. Obviously any suitable means may be employed to retain the members in slidable engagement; instead of the rivets and slots for example, lugs integral with one member may be bent round the other member to form clips or guides, or separate clips may be employed.

I claim:—

1. A fish hook disgorger comprising a spiked tissue-engaging member and an extractor member having slidable engagement therewith and provided with a notch to engage the fish hook.

2. A fish hook disgorger comprising a tissue-engaging member having a spiked bifurcated end to straddle the fish hook and an extractor member having slidable engagement therewith and provided with a notch to engage the fish hook.

3. A fish hook disgorger comprising a guide member having a bifurcated end, the arms of the bifurcation being separated by a slot and terminating in spikes to engage the tissue, and an extractor member having slidable engagement with said guide member.

4. A fish hook disgorger comprising a guide member having a bifurcated end, the arms of the bifurcation being separated by a slot and terminating in spikes to engage the tissue, and an extractor member having slidable engagement with said guide member, the end of said extractor member being notched, the bottom of the notch moving over the slot of the guide member.

5. A fish hook disgorger having a tissue-engaging member and an extractor member having slidable engagement therewith, the tissue engaging member having a pair of spiked ends and a recess therebetween to house the point of the fish hook after extraction.

6. A fish hook disgorger comprising a guide member having a bifurcated end, the hooked ends of the guide member serving to prevent rearward movement of the tissue from which the hook is being removed during such removal, and an extractor member having slidable engagement with said guide member, the end of said extractor member being notched, the bottom of the notch moving over the slot of the guide member to force a hook outwardly in the slot in the guide member when the extractor is advanced.

In testimony whereof I affix my signature.

GEORGE WILLIAM JEFFERY.